(12) United States Patent
Webb, Jr. et al.

(10) Patent No.: US 7,660,074 B1
(45) Date of Patent: Feb. 9, 2010

(54) WEBBED GROUND PLANE STRUCTURE FOR INTEGRATED LEAD SUSPENSIONS

(75) Inventors: Larry C. Webb, Jr., Hutchinson, MN (US); Michael E. Roen, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 345 days.

(21) Appl. No.: 10/938,935

(22) Filed: Sep. 10, 2004

Related U.S. Application Data

(60) Provisional application No. 60/501,942, filed on Sep. 11, 2003.

(51) Int. Cl.
*G11B 5/48* (2006.01)

(52) U.S. Cl. .................. 360/245.8; 360/244.3; 174/250

(58) Field of Classification Search ............... 360/264.2, 360/245.8, 245.9, 244.3; 174/250, 254, 260
See application file for complete search history.

(56) References Cited

U.S. PATENT DOCUMENTS

| | | | |
|---|---|---|---|
| 5,712,749 A * | 1/1998 | Gustafson | 360/246 |
| 5,771,568 A | 6/1998 | Gustafson | 29/603.03 |
| 5,864,445 A | 1/1999 | Bennin et al. | 360/104 |
| 5,995,329 A | 11/1999 | Shiraishi et al. | 360/104 |
| 6,014,290 A | 1/2000 | Supramaniam et al. | 360/104 |
| 6,069,479 A | 5/2000 | Taicher et al. | 324/309 |
| 6,249,404 B1 * | 6/2001 | Doundakov et al. | 360/245.4 |
| 6,262,495 B1 | 7/2001 | Yablonovitch et al. | 307/101 |
| 6,295,183 B1 | 9/2001 | Nuno et al. | 360/246 |
| 6,351,436 B1 * | 2/2002 | Mallary | 369/13.17 |
| 6,385,014 B1 | 5/2002 | Nuno et al. | 360/246 |
| 6,704,164 B1 * | 3/2004 | Hiraoka | 360/244.8 |
| 6,714,385 B1 | 3/2004 | Even et al. | 360/246 |
| 6,762,913 B1 * | 7/2004 | Even et al. | 360/246 |
| 6,940,697 B2 * | 9/2005 | Jang et al. | 360/264.2 |
| 7,092,214 B2 * | 8/2006 | Hernandez | 360/245.9 |
| 7,408,744 B1 * | 8/2008 | Cuevas | 360/244.8 |
| 7,489,479 B2 * | 2/2009 | Arya et al. | 360/245.9 |
| 2002/0089791 A1 * | 7/2002 | Morley et al. | 360/245.9 |
| 2002/0181156 A1 * | 12/2002 | Shiraishi et al. | 360/245.9 |
| 2006/0245112 A1 * | 11/2006 | Shum | 360/245.9 |

\* cited by examiner

*Primary Examiner*—Brian E Miller
(74) *Attorney, Agent, or Firm*—Faegre & Benson LLP

(57) ABSTRACT

A webbed ground plane includes a plurality of slots and a plurality of struts between the slots. The slots and struts have generally equal lengths and extend below a length of the leads such that eddy current losses in the leads are reduced to near zero.

3 Claims, 5 Drawing Sheets

WEBBED GROUND PLANE STRUCTURE FOR INTEGRATED LEAD SUSPENSIONS

REFERENCE TO RELATED APPLICATION

This application claims the benefit of U.S. Provisional Application Ser. No. 60/501,942, filed Sep. 11, 2003, and entitled Webbed Ground Plane Structure For Integrated Lead Suspensions, which is incorporated herein in its entirety.

FIELD OF THE INVENTION

The present invention relates generally to integrated lead or wireless suspensions and components. In particular, the invention is a ground plane structure for an integrated lead suspension or component.

BACKGROUND OF THE INVENTION

Integrated lead or wireless disk drive head suspensions are well known and commercially available. These devices generally include a load beam (typically formed from spring material such as stainless steel), a flexure (also typically formed from stainless steel) on a distal end of the load beam, conductors (also known as traces or leads and typically formed from copper or copper alloys) extending toward the proximal end of the load beam from the flexure, and a dielectric insulator between the conductors and adjacent stainless steel portions. Suspensions of these types can be formed from a laminate including layers of stainless steel and copper separated by a layer of dielectric. In one approach (e.g., Bennin et al. U.S. Pat. No. 5,864,445), the load beam and flexure are etched and formed from the same stainless steel layer of the laminate, and the conductors are etched from the conductor layer. Another approach (e.g., Supramaniam et al. U.S. Pat. No. 6,014,290) includes a so-called integrated lead flexure that is formed from the laminate material and a load beam that is formed separately from stainless steel. The integrated lead flexure is welded or otherwise attached to the load beam.

The leads, in connection with the underlying stainless steel (a conductor layer that functions as a ground plane) form a transmission line for coupling electronic read/write signals to and from a magnetic head mounted to the flexure. Windows or apertures are sometimes formed in the stainless steel below the ground plane to reduce the impedance of the transmission line. These windows are typically about 1 mm in length (i.e., in the longitudinal direction of the leads). Unfortunately, these transmission line structures are still susceptible to eddy current losses.

There remains, therefore, a continuing need for improved transmission line structures for integrated lead suspensions. In particular, there is a need for relatively low loss transmission line structures that are capable of being manufactured with a range of impedances. To be commercially viable the structures should be capable of being efficiently manufactured.

DETAILED DESCRIPTION OF THE PREFERRED EMBODIMENTS

Figure 1:
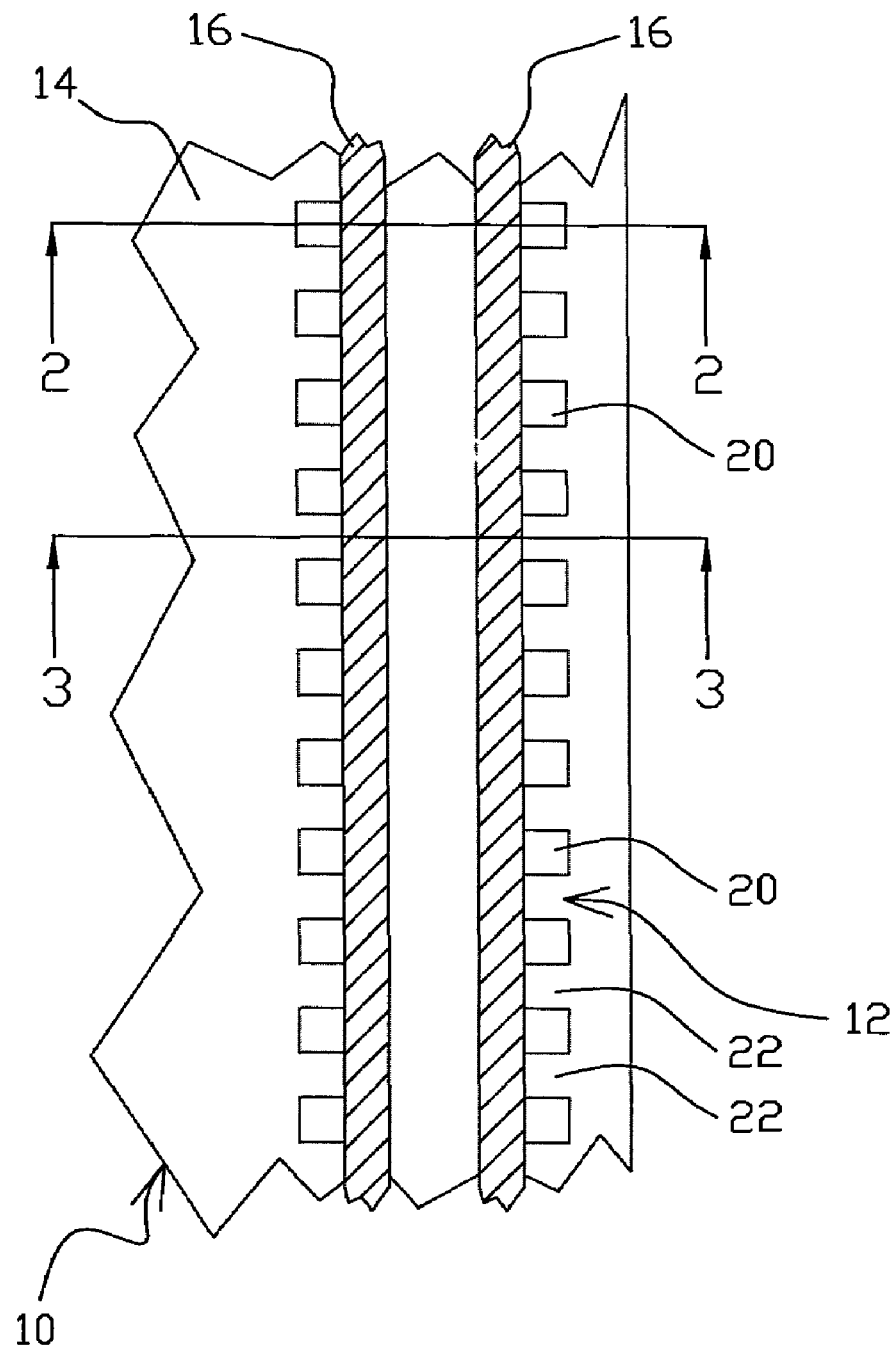
FIG. 1 is a top view illustration of a portion of an integrated lead flexure having a webbed ground plane in accordance with the present invention (i.e., a view from the side of the flexure having the conductive leads).
Figure 2:
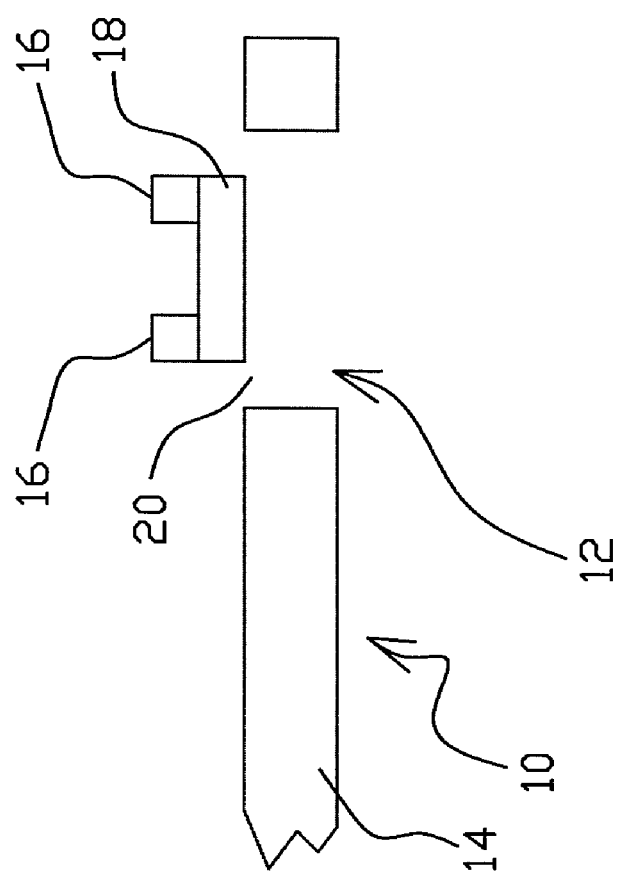
FIG. 2 is a sectional view of the flexure shown in FIG. 1, taken along lines 2-2.
Figure 3:
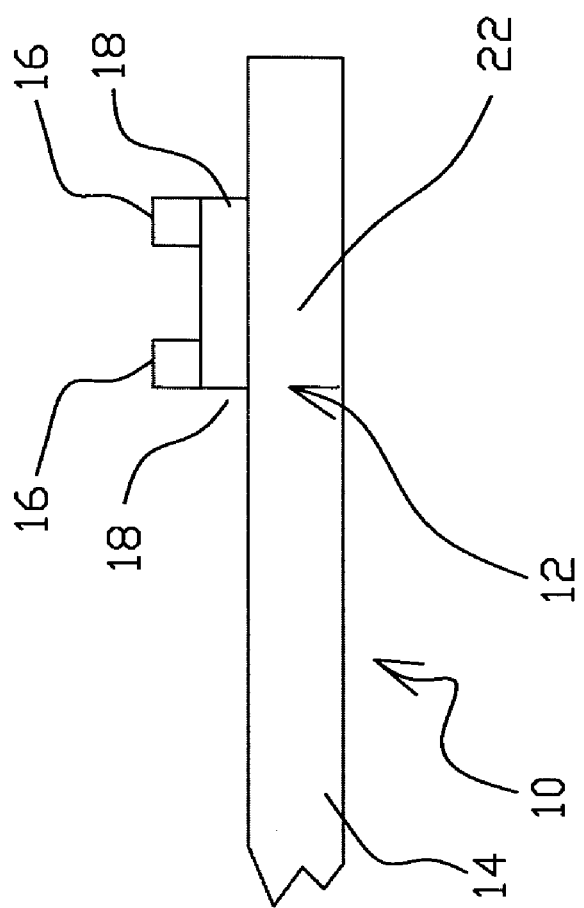
FIG. 3 is a sectional view of the flexure shown in FIG. 1, taken along lines 3-3.
Figure 5:
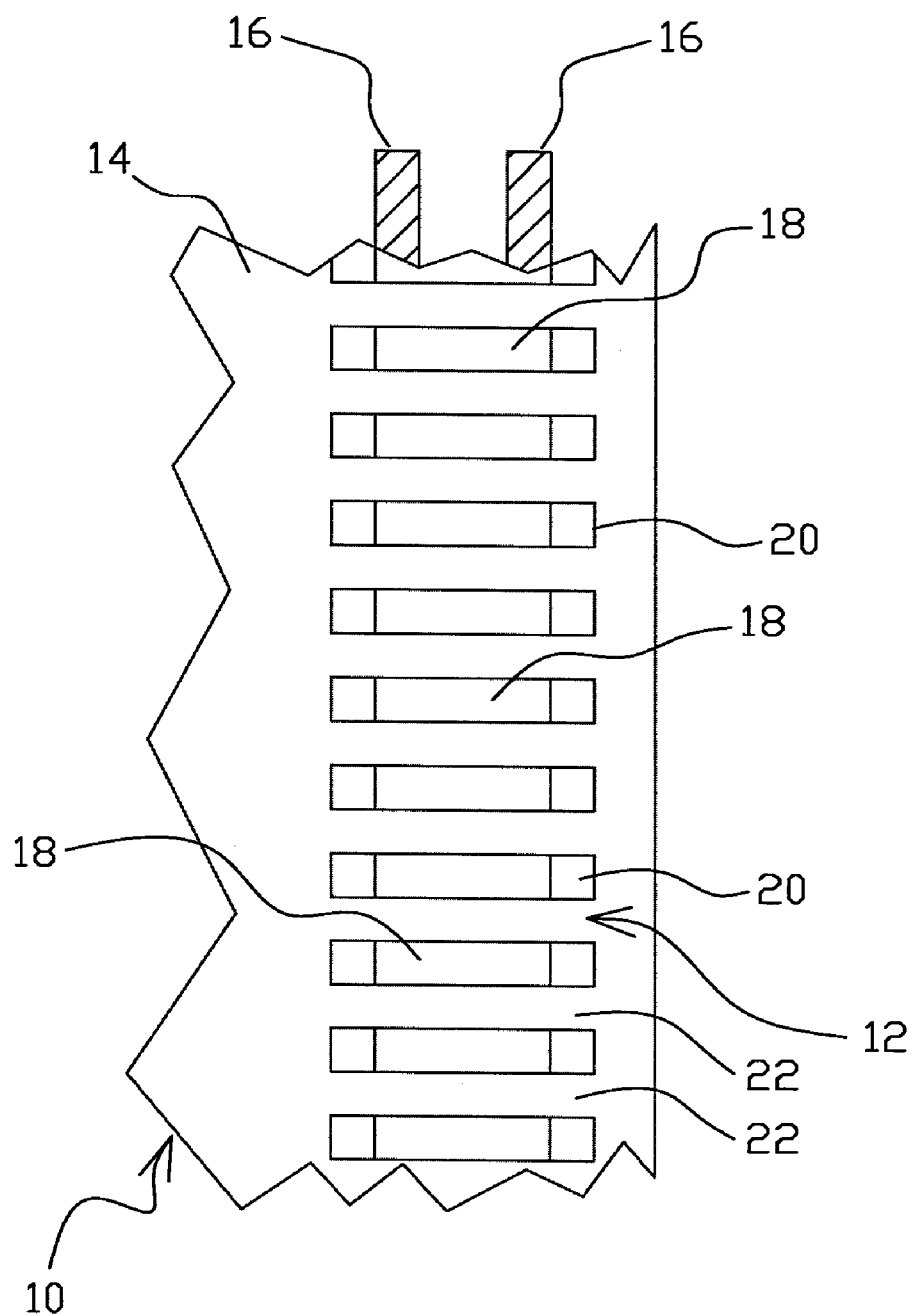
FIG. 5 is a bottom view illustration of the portion of an integrated lead flexure shown in FIG. 1 (i.e., a view from the side of the flexure opposite that shown in FIG. 1).

FIGS. 1 and 5 illustrate a portion of an integrated lead flexure 10 having a webbed ground plane 12 in accordance with one embodiment of the invention. FIGS. 2 and 3 are sectional views of the flexure, taken along lines 2-2 and 3-3, respectively, in FIG. 1. As shown, the flexure 10 has a stainless steel or other spring metal member 14. A number of conductive metal (e.g., copper) leads 16, also known as traces, extend along a length of the member 14 and are separated from adjacent or underlying portions of the member by dielectric 18.

The webbed ground plane 12 is formed by a plurality of apertures such as slots 20 through the member 14 (or other openings such as circles or chevrons). Slots 20 are separated by portions of the member 14 that can be referred to as struts 22. Each slot 20 extends below a pair of leads 16 in the illustrated embodiment, and has a width (the dimension transverse to the longitudinal axis of the leads) that is greater than the sum of the width and spacing of the leads. In the embodiment shown the slots 20 extend completely under and beyond the opposite outer edges of the leads 16. Slots 20 and struts 22 are substantially smaller in lengthwise dimension (the direction of the longitudinal axis of the leads 16) than the windows in prior art devices of the type described above. In one embodiment, the length of the slots 20 and struts 22 are less than or equal to about 0.10 mm. In another and preferred embodiment, the length of the slots 20 and struts 22 are less than or equal to about 0.075 mm. In a most preferred embodiment, the length of the slots 20 and struts 22 are less than or equal to about 0.05 mm. In the illustrated embodiment slots 20 and struts 22 have generally equal lengths. In other embodiments (not shown), slots 20 can be longer or shorter than struts 22.

Flexures such as 10 with webbed ground planes 12 can be formed from laminated sheets of material by chemical etching using known or otherwise conventional methods. The illustrated embodiment of flexure 10 has the dielectric material 18 removed from all portions of the member 14 except those that are under and between leads 16. In other embodiments (not shown) the dielectric material 18 can remain on additional portions of member 14 or be removed from other portions of the flexure 10.

Figure 4:
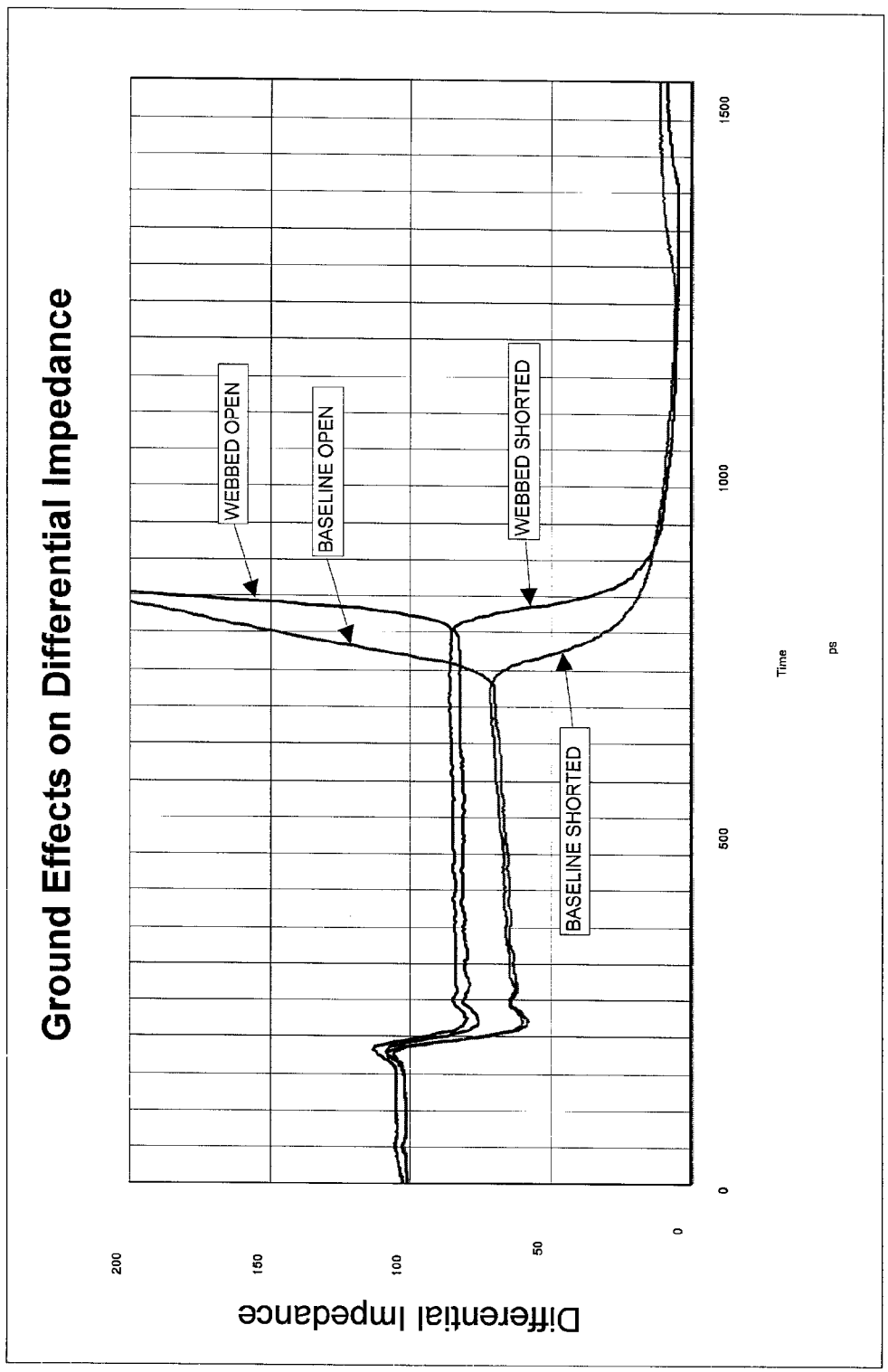
FIG. 4 is a graph of differential impedance vs. time for a webbed ground plane in accordance with the present invention.

FIG. 4 is a Time Domain Reflectometry (TDR) measurement showing the differential impedance vs. time for both a webbed ground plane in accordance with the present invention and a baseline (non-webbed) ground plane. For both the webbed and baseline ground plane the impedance is shown with the leads both shorted and open. Losses in a TDR measurement are shown as a slope in differential impedance vs. time. Therefore, the greater the slope of the measurement, the greater the losses. The graph in FIG. 4 shows that the impedance of the webbed ground plane is only slightly greater (20-30) than the baseline, but has significantly lower eddy current losses (close to zero). The invention therefore provides a transmission line structure having both low impedance and low losses. The measurements shown in FIG. 4 are taken from a baseline ground plane structure having no webbing, and from a webbed structure having slots and struts that are 0.05 mm in length (0.1 mm pitch).

Although the present invention has been described in connection with preferred embodiments, those skilled in the art will recognize that changes can be made in form and detail without departing from the spirit and scope of the invention. By way of example only, although the invention is described in connection with the stainless steel layer of the suspension components, the webbed ground plane can be implemented in copper or other conductive material layers as well.

The invention claimed is:

1. An integrated lead suspension comprising:
   a plurality of substantially parallel leads having a lead length along a longitudinal axis of the leads and a lead width transverse to the lead length;
   a webbed ground plane including a plurality of slots, wherein each slot has a slot width transverse to the lead length that is greater than a sum of the lead widths and a spacing between the leads; and
   a dielectric layer between the plurality of leads and the webbed ground plane, wherein a dielectric width transverse to the lead length is less than the slot width, and wherein the dielectric width is substantially equal to the sum of all lead widths and a spacing between the leads.

2. The integrated lead suspension of claim 1, wherein the slots have a slot length transverse to the slot width less than or equal to about 0.075 mm.

3. The integrated lead suspension of claim 1, wherein the slots have a slot length transverse to the slot width less than or equal to about 0.05 mm.

* * * * *

UNITED STATES PATENT AND TRADEMARK OFFICE
CERTIFICATE OF CORRECTION

PATENT NO. : 7,660,074 B1 Page 1 of 1
APPLICATION NO. : 10/938935
DATED : February 9, 2010
INVENTOR(S) : Webb, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 414 days.

Signed and Sealed this

Thirtieth Day of November, 2010

David J. Kappos
*Director of the United States Patent and Trademark Office*